(12) United States Patent
Bennett

(10) Patent No.: US 7,125,439 B2
(45) Date of Patent: Oct. 24, 2006

(54) AIR ENVIRONMENT CONTROL SYSTEM AND TECHNIQUE

(75) Inventor: Edward John Bennett, Surrey (GB)

(73) Assignee: Aircontrol Technologies Limited, Staines Middlesex (GB)

(*) Notice: Subject to any disclaimer, the term of this patent is extended or adjusted under 35 U.S.C. 154(b) by 54 days.

(21) Appl. No.: 10/866,098

(22) Filed: Jun. 14, 2004

(65) Prior Publication Data

US 2005/0139071 A1 Jun. 30, 2005

(30) Foreign Application Priority Data

Jun. 13, 2003 (GB) ................................. 0313775.9

(51) Int. Cl.
*B01D 53/47* (2006.01)
(52) U.S. Cl. ............................. 95/268; 95/96; 96/121; 96/142
(58) Field of Classification Search ................. 96/121, 96/126–128, 134, 142; 95/96, 106, 267, 95/268, 273; 55/315, DIG. 17
See application file for complete search history.

(56) References Cited

U.S. PATENT DOCUMENTS

| | | | |
|---|---|---|---|
| 3,967,464 A * | 7/1976 | Cormier et al. ............... 62/650 |
| 4,732,579 A | 3/1988 | Veltman et al. |
| 4,769,051 A | 9/1988 | Defrancesco |
| 4,793,832 A | 12/1988 | Veltman et al. |
| 5,151,022 A * | 9/1992 | Emerson et al. ......... 423/245.3 |
| 5,213,593 A | 5/1993 | White, Jr. |
| 5,298,054 A | 3/1994 | Malik |
| 5,323,624 A | 6/1994 | Schwalm |
| 5,327,744 A | 7/1994 | Frawley et al. |
| 5,403,384 A | 4/1995 | Faul et al. |
| 6,402,812 B1 | 6/2002 | Perrotta et al. |
| 2002/0056373 A1 | 5/2002 | Fielding |
| 2002/0134236 A1 * | 9/2002 | Jensvold et al. ............... 95/47 |

FOREIGN PATENT DOCUMENTS

| | | |
|---|---|---|
| EP | 0 935 102 | 8/1999 |
| WO | WO 9623188 | 8/1996 |

OTHER PUBLICATIONS

European Search Report dated Sep. 3, 2004 re application EP 04 25 3446.

* cited by examiner

Primary Examiner—Frank M. Lawrence
(74) Attorney, Agent, or Firm—Fish & Richardson P.C.

(57) ABSTRACT

Method and apparatus for providing clean air to an environment. Incoming air, which may be contaminated with chemical, nuclear or biological contamination is initially cooled and water is removed from the cooled air by a first cooler, a first water separator, a second cooler and a second water separator. The cooled air is passed through a regenerative pressure swing absorption system which removes the contaminants. The resulting, cleaned, air is expanded by an expander. The expanded, cleaned air is provided to the environment, after being used in the second cooler to clean the incoming air.

31 Claims, 2 Drawing Sheets

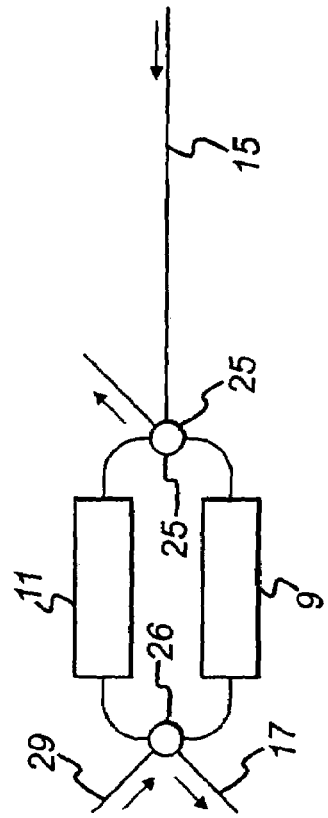
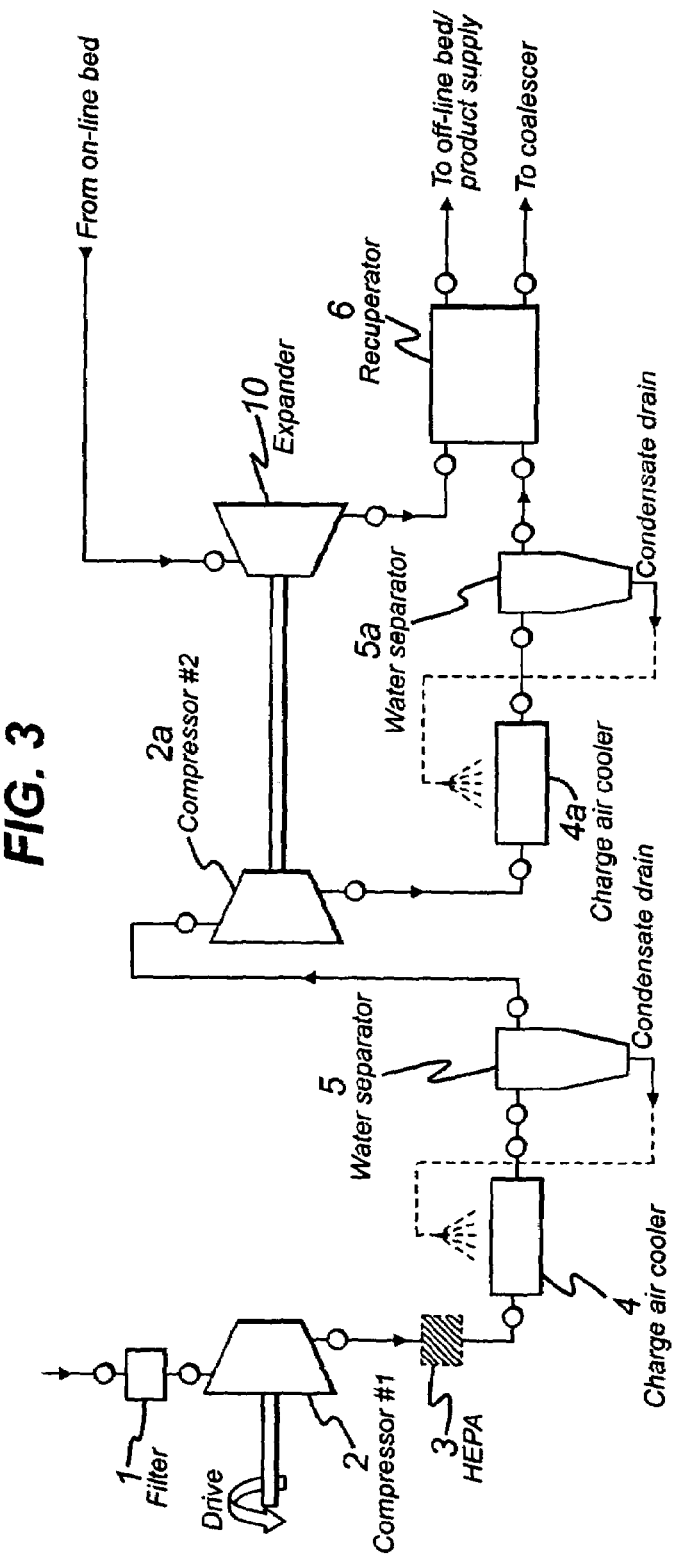
FIG. 2
FIG. 3

AIR ENVIRONMENT CONTROL SYSTEM AND TECHNIQUE

CROSS-REFERENCE

This application claims priority under 35 USC §119(a) to British Patent application number No. 0313775.9, filed on Jun. 13, 2003, the entire contents of which are hereby incorporated by reference.

TECHNICAL FIELD

This description relates to a method and apparatus for controlling air environments, in particular to remove contaminants from the environment. The technology finds utility in particular in environmental life support systems for military platforms and military or civilian shelters where protection from nuclear, biological and chemical (NBC) weapons is required. The technology is also useful for protection of other environments, for example those that may be exposed to toxic materials, including industrial chemicals, gases and the like.

BACKGROUND

Military platforms and installations must be able to operate effectively when under attack or threat of attack by NBC weapons. To ensure that operating efficiency is maintained, collective protection is normally provided by creating a clean positive pressure environment within the enclosed occupied space with filtered air. Under such conditions personnel can continue to operate without the encumbrance of protective gloves and respirators which greatly reduce operating effectiveness.

Traditionally, environmental life support systems have been based upon activated charcoal filters for gas filtration, cooling being by vapour cycle refrigeration. Although providing a high level of protection, activated charcoal filters are not regenerative and must be discarded and replaced following a chemical attack. The effective life of the filters is dependent on the concentration and nature of the challenge but may only be a few hours with some chemicals.

This severely limits the effective operation of a platform when chemical weapons are deployed against them and creates high operational costs due to the logistics chain required to provide a regular supply of new filters and also the concomitant removal and disposal of contaminated filters.

More recently systems have been developed based upon regenerative filtration in place of the non-reusable activated carbon elements.

A number of proposals have been made to provide systems utilising pressure swing adsorption (PSA) systems developed by PALL Corporation.

Pressure swing adsorption systems use beds filled with a sorbent material which adsorbs gases under pressure and desorbs gases once the pressure is removed. The system has two beds, one on-line and fed with contaminated air under pressure from which contaminants are removed. At the same time, the other depressurised off-line bed is regenerating by purging with clean air. On completion of the cycle, the role of each bed is reversed, the operation being controlled by an automatic sequence timer to provide continuous uninterrupted service. Industrial PSA systems have been shown to operate for many years without degradation of performance or air quality. PSA systems developed by PALL Corporation have been shown to be efficient in removing a very wide range of chemical agents.

A number of proposals for environmental life support systems using PSA have appeared, as a consequence, in the patent literature.

U.S. Pat. No. 4,732,579, Veltman et al assigned to FMC Corporation, the disclosures of which are incorporated herein, proposes a system and method for providing a continuous supply of clean air at a desired temperature to the crew members of a combat vehicle. The contaminated air is said to be initially compressed by energy received from the exhaust gases from a combustion power unit of the vehicle, the initially compressed air being cooled to increase its density and then compressed and cooled a second time before being passed through a pressure swing adsorbent system. Air from the PSA system is expanded and changed in temperature to provide clean air to personnel within the vehicle. Energy released from the air during expansion is used to compress the air in the secondary compressor. The off line PSA bed is purged with clean air from the on line bed which is expanded through an orifice to lower its pressure.

U.S. Pat. No. 4,769,051, Defranceso assigned to United Technologies Corporation, the disclosures of which are incorporated herein, discloses an air conditioning system powered by a supply of compressed air. The compressed air passes to an air cycle machine having a compressor, a turbine and a load heat exchanger. Air from the compressor is communicated to the turbine which expands and cools the air before passing it to the load heat exchanger. A PSA system cleans air as it passes from the compressor to the turbine before expansion. Purge air for the PSA system is derived from the clean air exiting the load heat exchanger after first passing it through a regenerative heat exchanger which takes heat from the air as it passes from the compressor to the PSA system before passing on to the turbine.

U.S. Pat. No. 5,213,593, White et al assigned to PALL Corporation, the disclosures of which are incorporated herein, proposes a PSA system which has first and second sorbing chambers, each of which includes first and second openings defining a gas flow path between them and a sorbent bed disposed in the gas flow path and having a sorption inlet region near the first opening, and a heater positioned near the sorption inlet region. The heaters are operated from an external energy source. A valve arrangement interconnects an intake, an exhaust and the first openings of the first and second sorbing chambers and interconnects an outlet with the second openings of the first and second sorbing chambers. Gas is directed through one sorbing chamber to the outlet. At the same time a portion of the outlet gas is directed through the other sorbing chamber to the exhaust. Energy from the external energy source is coupled to the heater of the other sorbing chamber to heat the sorption inlet region of the other sorbing chamber as the outlet gas flows through the sorption inlet region. The controller is adapted to cycle between the first and second sorbing chambers according to a NEMA cycle length of less than about five minutes. One sorbent bed adsorbs at least a portion of contaminant from the gas and is heated by the heat of adsorption and the other sorbent bed is regenerated using both the energy supplied by the heater and the heat of adsorption.

A problem with previously proposed PSA systems is the high energy requirement for the compression of the contaminated air required to achieve the pressures required for the PSA beds. This energy requirement has been a constraint on the commercialisation of PSA systems. Commonly owned earlier U.S. Pat. No. 6,099,617, Bennett, the disclosures of which are incorporated herein, discloses a method of providing clean air at a desired temperature to an environment which is more energy efficient than prior systems by using heat derived from the step of compressing the incoming air elsewhere in the system. The method comprises compressing incoming air possibly contaminated with nuclear, biological and chemical contaminants, cooling the compressed air in a first heat exchanger, compressing the cooled air from the first heat exchanger in a secondary compressor, cooling the compressed air from the secondary compressor in a secondary heat exchanger, and directing the cooled air from the secondary heat exchanger through a regenerative pressure swing adsorption system for providing clean output air with the contaminants removed therefrom. The cleaned air is then expanded in a turbine coupled to the secondary compressor, thereby recovering energy from the cleaned air to drive the secondary compressor. The expanded cleaned air from the turbine is used to condition air in the environment and to purge the regenerative pressure swing adsorption system. The purging air is warmed before being passed to the regenerative pressure swing adsorption system by heat derived from the step of compressing incoming air, for example by heat exchange with cleaned air exiting the regenerative pressure swing adsorption system, to pass purging air to the regenerative pressure swing adsorption system at the optimum temperature for efficient operation thereof.

Whilst the system described in our earlier US Patent makes use of waste energy within the system, and therefore improves the efficiency of the system, the overall life support system is still considered energy inefficient.

SUMMARY

Various aspects and implementations are provided herein.

According to a first aspect, a method for providing clean air to an environment comprises compressing incoming air possibly contaminated with nuclear, biological and chemical contaminants, cooling the compressed air, removing water from the cooled compressed air, directing the cooled, compressed air through a regenerative pressure swing adsorption system to provide clean output air with contaminants removed therefrom, and expanding the cleaned air in an expander, and providing the cleaned air to the environment, in which the step of cooling the compressed air and removing water from the compressed air includes the step of passing the compressed air through a first cooler, passing the cooled air through a first water separator, passing the cooled air through a second cooler in which the cooled air is further cooled by cleaned air from the expander, and passing the air through a second water separator.

By minimising the water content of the air supplied to the on-line bed of the PSA system, the bed can operate more efficiently, for example, at a lower pressure. By utilising the cool air from the expander to reduce the temperature of the compressed inlet air to enable a significant reduction in the moisture content of the inlet air, an appreciable increase in the efficiency of the system can be achieved without the need to provide additional external energy to operate the system or to cool the inlet air. Furthermore, the reduction in the temperature of the inlet air supplied to the PSA bed results in lower temperature cleaned air from the bed.

In previously proposed systems, the cool air form the expander has been used to reduce the temperature in the environment. However, this is not efficient, especially where cooling of the environment is required but where there is no threat from atmospheric contamination.

The compression is suitably achieved by a turbo compressor, a piston compressor or a screw compressor, or by bleeding air from a gas turbine engine or the like. Where a compressor is provided, this may be driven through a gearbox, and may be driven from the engine of a vehicle, through the crankshaft of an auxiliary power unit, or by a hydraulic or electric motor.

Advantageously, the inlet air is filtered before this is compressed. This filtering may remove particulate matter from the air. A suitable filter for this purpose is an inertial separator. Advantageously, the filter is a self-cleaning device. This is particularly advantageous where the ambient air is potentially contaminated by nuclear agents since it is beneficial not to retain radioactive material in close proximity to personnel, or to require such material to be removed by personnel.

The compressed air is preferably filtered to remove biological agents, for example by passing compressed air through a high efficiency particulate (HEPA) filter. This removes any biological agents contained in the air stream that may not be removed by the pressure swing adsorption system. By positioning the filter after the compressor stage, the removed biological agents will be exposed to a prolonged period of heating by the hot, compressed air flowing through the filter, and this will destroy the agents. If the filter is positioned before the compressor, the biologic agents will not be subjected to this heating, and so will not be destroyed.

The first cooling step may use heat exchange with ambient air, water or other cooling media.

Advantageously, the condensate from the first and/or second water separator water removal stage is used to further cool the inlet air, by spraying this onto the first cooler to give evaporative cooling.

Prior to the compressed and cooled inlet air being provided to the on-line bed of the regenerative pressure swing adsorption system, it is preferred that any water droplets are removed from the air. This may be achieved by passing the air through a coalescer, in which any water droplets in the air are trapped and coalesced by media within the coalescer. The coalescer may act as the second water separator. Advantageously, a heater is provided upstream of the on-line bed of the regenerative pressure swing adsorption system to increase the temperature of the air, and to reduce the relative humidity of the air to below 100%. This helps ensure that the air does not include any water droplets when this is directed to the on-line bed of the pressure swing adsorption system. Beneficially, the air is heated using waste heat from elsewhere in the system, for example waste heat from the compression of the inlet air. This waste energy may be derived from the compressor drive, for example in the form of hot oil from the compressor gearbox or engine lubricating system, hydraulic fluid, engine hot water, or simply directly from the heat of compression. In this way, the system can be made more efficient by utilising waste heat that would otherwise require dissipation.

It is preferred that the air supplied to the on-line bed of the regenerative pressure swing adsorption system has a dew point below around 10° C. at standard temperature and pressure. It has been found to improve the efficiency of the regenerative pressure swing adsorption system significantly when the moisture content of the air is at or below this level.

Advantageously, the compression of the inlet air is achieved in two or more sequential steps. This is advantageous as the pressure of the compressed air may be increased, and/or the compression of the air is more efficient. In this case, it is preferred that there is a cooling and water removal step associated with each stage of compression.

According to a second aspect, an apparatus for providing clean air conditioned air to an environment comprises a compressor for compressing inlet air, a first cooler for cooling the inlet air compressed by the compressor, a first water removal mechanism for removing water from the cooled, compressed air, a second cooler for further cooling the inlet air, a second water removal mechanism for removing additional water from the air, a regenerative pressure swing adsorption system for removing contaminates from the air, and an expander for expanding cleaned air from the pressure swing adsorption system for supply to the environment, in which the air is cooled in the second cooler by the cool expanded air from the expander.

The apparatus according to this aspect is particularly useful for implementing the method according to the first aspect. The provision of the coolers and water separators ensure that the air supplied to the PSA system has a low moisture content to improve the efficiency of the PSA system. By utilising the cool air from the expander to cool the inlet air to remove water, minimal external energy is required.

The pressure swing adsorption system may comprise two filter beds cyclable so that one is on-line and fed with contaminated air while the other is off-line and purged with purge air. The system is cycled to reverse the role of each bed periodically. A purge line is coupled to the expander so as to derive purge air from air expanded by the expander to purge the off-line bed.

The compression is suitably achieved by a turbo compressor, a piston compressor or a screw compressor or by bleeding air from a gas turbine engine or the like. Where a compressor is used, this may be driven through a gearbox, and may be driven from the engine of a vehicle, through the crankshaft of an auxiliary power unit, or by a hydraulic or electric motor.

Advantageously, a filter is provided to filter the inlet air before this is compressed. This filtering may remove particulate matter from the air. A suitable filter for this purpose is an inertial separator. Advantageously, the filter is a self-cleaning filter.

A filter is beneficially provided after the compressor to remove biological agents from the compressed air. A suitable filter is a high efficiency particulate (HEPA) filter. By removing any biological agents contained in the air stream, which may not be removed by the pressure swing adsorption system, protection is given against biological attack. By locating the filter after the compressor, removed biological agents are exposed to hot gas from the compressor which can destroy the biological agents.

The first cooler may be in the form of a heat exchanger, for example an ambient air, or liquid cooled heat exchanger.

Advantageously, condensate from the first and/or second water removal mechanisms is used to further cool the inlet air, by spraying this onto the first cooler to give evaporative cooling.

The system may include a coalescer for the removal of any water droplets in the air. The coalescer may act as the or one of the water separating mechanism, or may be separate from the water removal mechanism. Advantageously, a heater is provided upstream of the on-line bed of the regenerative pressure swing adsorption system to increase the temperature of the air, and to reduce the relative humidity of the air to below 100%. This helps ensure that the air does not include any water droplets when this is directed to the on-line bed of the pressure swing adsorption system. Beneficially, the air is heated using waste heat from elsewhere in the system, for example waste heat from the compression of the air. In this way, the system can be made more efficient by utilising waste heat that would otherwise require dissipation.

It is preferred that the air supplied to the on-line bed of the regenerative pressure swing adsorption system has a dew point below around 10° C. at standard temperature and pressure. It has been found to improve the efficiency of the regenerative pressure swing adsorption system significantly when the moisture content of the air is at this level.

Advantageously, additional compressors are provided to compress the inlet air in two or more sequential steps. This is advantageous as the pressure of the compressed air may be increased, and/or the compression of the air is more efficient. In this case, coolers and water removers may be associated with each stage of compression.

To further improve system efficiency, the expander may be coupled to at least one of the compressors, thereby recovering energy from the cleaned air to drive the compressor.

Advantageously, the system also includes a mechanism for cooling the air in the environment to be controlled. In a preferred example, the additional cooler is in the form of a vapour cycle cooling system.

DESCRIPTION OF THE DRAWINGS

The technology will now be described, by way of example, with reference to the accompanying drawings, in which:

FIG. 2 shows schematically the pressure swing adsorption system; and,

FIG. 3 shows a schematic drawing of a regenerative air control system according to another exemplary implementation.

DETAILED DESCRIPTION

Figure 1:
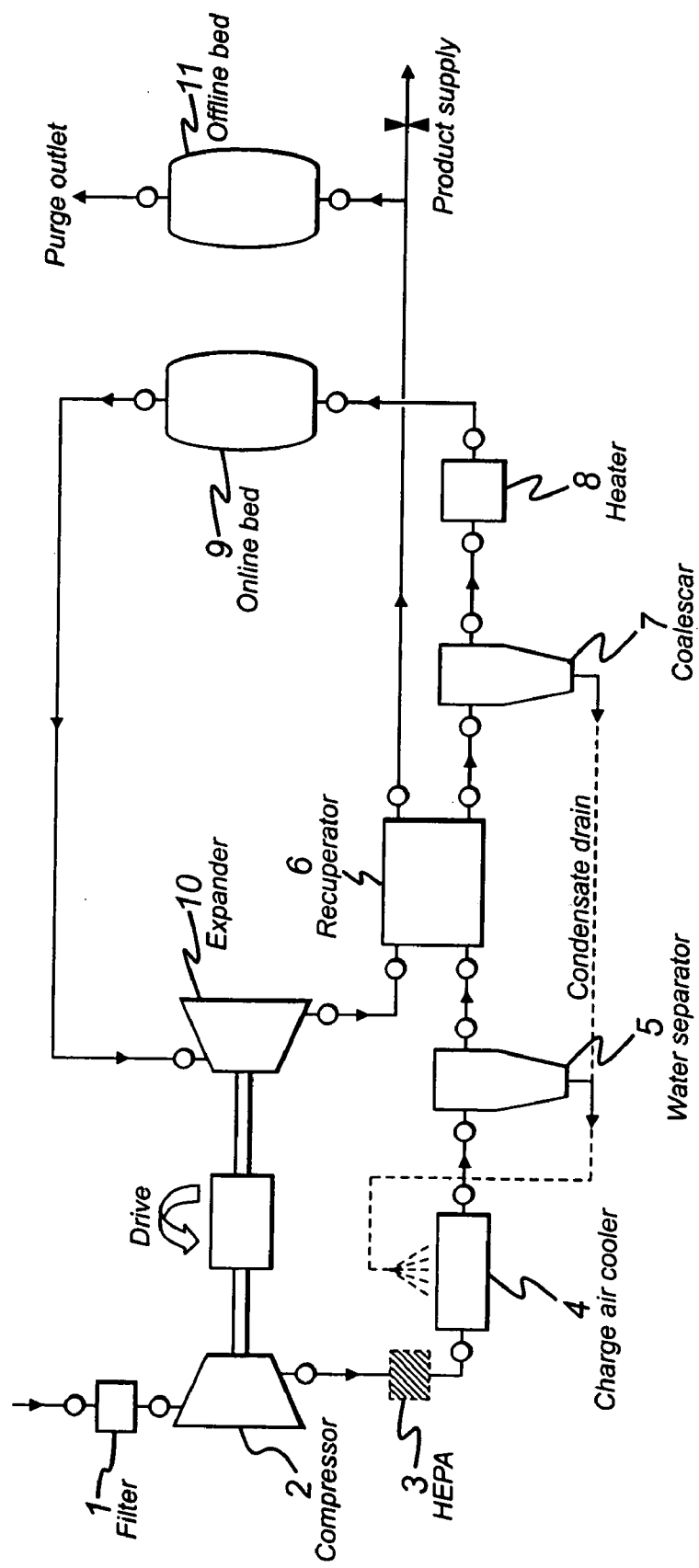
FIG. 1 shows a schematic drawing of a regenerative air control system according to one exemplary implementation.

FIG. 1 shows schematically a typical embodiment of a system according to the first implementation.

Ambient air is passed to the on-line bed 9 of a pressure swing adsorption system. By providing the air to the on-line bed 9 at a high pressure, the pressure swing adsorption is able to adsorb contaminants from the air, and therefore provide a source of clean air as required.

Air is input to the system from the environment. The air will therefore be at ambient temperature and pressure, and will have a moisture content dependent upon the environment. The input air is filtered to remove particles from the air using a suitable filter, for example an inertial separator 1. The filtered air is then compressed using a compressor 2.

The compressor 2 may be any suitable compressor, for example a radial turbo compressor, a piston compressor or a screw compressor. The type of compressor used will depend upon a number of factors, including the required volume of air flow, and the pressure to which the air must be compressed. The compressor 2 is driven by a suitable power source, for example from the crankshaft of an auxiliary engine, or by a hydraulic or electric motor, or by the main engine of a vehicle in which the system is fitted. In the present example, the compressor 2 may compress the air to a pressure of around 300 kPa absolute, although the pressure to which the air is compressed will be dependent upon the available power and requirements of the system installation. The compression of the input air by the compressor 2 will significantly increase the temperature of the air, typically to temperatures in excess of 190° C.

Alternatively, compressed air can be provided by bleeding air from a gas turbine compressor or the like.

The compressed air may then pass through a filter 3 to remove biological agents. A suitable filter 3 is a high efficiency particulate (HEPA) filter. The biological agents that are trapped and thereby removed from the airstream by the filter 3 will be destroyed by the prolonged exposure of these to high temperatures by the high temperature air passing through the filter 3 from the compressor 2.

Before the compressed air can be passed to a bed of a pressure swing adsorption system, the air is cooled and the moisture content reduced. As shown in FIG. 1, a charge air cooler 4 is provided to cool the air, for example cooling the air to a temperature of around 40° C. The charge air cooler 4 may be in the form of an air-to-air heat exchanger that is able to cool the compressed air passing through the cooler 4 using ambient air. Alternatively, the charge air cooler 4 may use heat exchange with liquid, depending what is available. Where the system is used on a ship or boat, sea or river water may be used. Control of the temperature of the air leaving this heat exchanger may be achieved by control of the coolant flow.

A first water separator 5 is provided after the cooler 4. Due to the high pressure and reduced temperature of the compressed air, any free moisture in the air will easily condense. Accordingly, by passing the air through the water separator 5, for example a container with a opening in the bottom through which condensate may pass and be trapped to prevent this being entrained in the air flow, a significant part of the moisture contained in the ambient air may be removed. It has been found that for ambient air at around 35° C. with an initial moisture content of 29.9 $g.kg^{-1}$, compression of the air to around 300 kPa absolute pressure and a subsequent reduction in the temperature of the air to around 40° C. followed by passing the air through a water separator will reduce the moisture content to around 19.4 $g/kg^{-1}$, a reduction of around one third. In a preferred example, the water separator 5 may be formed as a header on the charge air cooler 4. This allows the number of components required for the system to be minimised, and reduces the number of interconnections between components.

The air is then passed through a second cooler 6, which further cools the air using expanded cleaned air from an expander 10 and on-line bed 9 of the pressure swing adsorption system. As described below, the high pressure air from the on-line bed 9 of the pressure swing adsorption system having passed through the expander will be at a low temperature. Therefore, this source of additional cooling makes efficient use of the energy in the system. The additional cooling stage may reduce the temperature of the air to around 20° C.

In the example shown in FIG. 1, the cooled air is passed though a coalescer 7. This is similar to the water separator 5, but additionally includes media that is provided to cause water droplets within the air to coalesce. The coalesced water droplets are then able to drain from the coalescer 7. Alternatively, a separate second water separator and coalescer may be provided.

In the example given above, where the inlet air has a moisture content of 29.9 $g.kg^{-1}$, which is reduced to a water content of around 19.4 $g.kg^{-1}$ after leaving the water separator 5, the air leaving the coalescer may have a temperature of around 20° C. and a water content of around 6.9 $g.kg^{-1}$, which equates to a dew point of below 10° C. at standard temperature and pressure.

In a preferred example, as shown in FIG. 1, the condensate from the water separator 5 and/or the coalescer 7 may be sprayed onto the charge air cooler 4. Since the condensate will be at a low temperature compared to the surface of the charge air cooler 4, the water will evaporate, giving additional evaporative cooling.

The air from the coalescer will have a relative humidity of around 100%, and may therefore include some small droplets. Such droplets will reduce the efficiency of the pressure swing adsorption system, and it is therefore useful to remove these from the air before this is supplied to the on-line bed 9. Accordingly, a heater 8 is provided to slightly heat the air to around 23° C. This will cause any water remaining in the air stream to be vapourised, and will reduce the relative humidity of the air to below 100%. This ensures that the air will not include any water droplets as it is passed to the on-line bed 9 of the pressure swing adsorption system.

The heater 8 may use any available source of energy, but preferably uses waste energy from elsewhere in the system. For example, the heater 8 may use waste energy from the compression of the inlet air, or energy from a vehicle's engine etc.

The pressure swing adsorption filtration beds are any one of a number of known such systems, including those available from PALL Corporation. The potentially contaminated, low temperature, high pressure, dry air from the heater 8 is passed through the on-line bed 9 of the pressure swing adsorption system, which adsorbs contaminants from the air stream. Therefore, a clean air stream, with no significant contamination, is output from the on-line bed 9.

FIG. 2 illustrates schematically the pressure swing adsorption system. The system comprises two filter beds 9 and 11 which are identical. Each is filled with a sorbent material which adsorbs gases under pressure and desorbs gases once the pressure is removed. The system is controlled by valving 25 and 26 so that at any one time one of the two beds 9, 11 will be coupled to an inlet line 15 and to an outlet line 17 while the other is connected to purge line 29 and to purge air exhaust line 30 to atmosphere. The purge air flows through the bed in the opposite direction to the contaminated air, giving a "clean" end and a "dirty" end of the PSA system.

The on-line bed 9 of the pressure swing adsorption system removes chemicals from the air stream based on their boiling points. A typical pressure swing adsorption system is able to remove chemicals having boiling points in the range of around −84° C. to around 230° C. It will be appreciated that water, with a boiling point of 100° C. will be adsorbed by the pressure swing adsorption system, making it difficult for other chemicals to be adsorbed. It is therefore known to include additional material in the bed of the pressure swing adsorption system to seek to adsorb the water content in the air, such that other chemicals may be removed from the air stream. It is, however, difficult to remove water that has been adsorbed by the bed, and it is believed that a high pressure differential between the on-line bed 9 and the off-line bed 11 is required to remove the adsorbed water. It is therefore believed that the reduction in the water content of the air that is supplied to the on-line bed of the pressure swing adsorption system according to this implementation ensures that there is less water that could be adsorbed by the adsorbent in the bed, and therefore that the capture of other chemicals may be more efficient, and further that since there is less water to be removed when the on-line bed 9 is regenerated, the on-line bed 9 may be operated at a lower pressure than is otherwise the case. The lower pressure operation of the system, for example reducing the pressure required from 400 kPa to 300 kPa absolute, means that less energy is required to efficiently compress the incoming air, and therefore the overall energy requirements of the system are reduced.

Further, whilst prior system typically required two compression stages to compress the incoming air to the pressures required, this may not be needed.

The clean air leaving the on-line bed of the pressure swing adsorption system will be at a high pressure, and is therefore generally unsuitable for purging the off-line bed which must be maintained at low pressure or to supply to an environment, such as the crew cabin of a vehicle. Accordingly, the compressed clean air is expanded using an expander 10, such as a turbine. In a preferred example, the compressor 2 and the expander 10 are part of a screw compressor set. In this way, the energy recovered by the expansion of the gas can be used to reduce the power required to drive the compressor 2. The expansion of the clean air will also reduce the temperature of the air. In the example given in which the air is supplied to the on-line bed at an absolute pressure of around 300 kPa at a temperature of around 25° C., the expanded air will typically have a temperature of around −20° C.

As described above, the expanded, cool, clean air is passed through a heat exchanger or recuperator 6. In passing the air through the recuperator 6, there is heat exchange between the inlet air from the water separator 5 (for example at a temperature of around 40° C.) and the cool clean air from the expander 10 (for example at a temperature of around −20° C.). As a result, the inlet air will be cooled to enable further water removal as described above. As a consequence, the inlet air will give up energy to warm the clean air to a temperature of about 26° C. Accordingly, the clean purge air being supplied to the off-line bed 11 will be at a similar temperature to the air being supplied to the on-line bed 9.

The expanded, cleaned air, after passing through the recuperator 6 may be supplied to the environment to be conditioned. Whilst the cleaned air will generally be at a temperature below that of the ambient air, some additional cooling of the environment may be required. This can be provided by a suitable cooling mechanism, such as a vapour cycle refrigeration cooler. In this case, the lower temperature of the inlet air provided to the on-line bed will result in a lower temperature of cleaned air from the bed, requiring less cooling. Further, the removal of moisture from the air will provide a drier environment which is easier to cool due to the lower latent load. It will be understood that to maintain a clean environment within a protected enclosure the enclosed environment will need to be overpressured. The level of overpressure required for protection being dependent on the effective wind speed against the outer surface of the protected enclosure.

For the purging of the off-line bed 11, some clean air is passed through the off-line bed at a relatively low pressure compared to the pressure of the on-line bed 9 in a counter airflow direction to the air passing through the on-line bed 9. The chemicals adsorbed by the off-line bed 11 when this was the on-line bed are therefore desorbed, and are entrained in the purge air flow, which may be vented to atmosphere. After regeneration of the off-line bed 11 in this way, the on-line and off-line beds 9, 11 may be reversed, with the previously off-line bed 11 acting as the on-line bed to remove contaminants from the air flow, and the previous on-line bed 9, now at low pressure being regenerated using purging air, gives up the adsorbed gases which are removed by the clean purging air and returned to the contaminate environment.

FIG. 3 shows schematically part of an alternative exemplary implementation. In this diagram, the coalescer 7, heater 8 and pressure swing adsorption system beds 9, 11 are not shown as these correspond to those shown in FIG. 1. In this example, additional compression, air cooling and water removal stages are included compared to that shown in FIG. 1. In particular, ambient inlet air is filtered by a first filter 1 such as an inertial separator. The filtered air is compressed by a first stage compressor 2. This may be any suitable compressor, and may, for example, be run from the engine of the vehicle in which the system is provided or an electric motor in static shelters and ships. The compressed air may then pass through a high efficiency particulate (HEPA) filter 3, before being passed through a first charge air cooler 4. The cooled air is then passed through a water separator 5 which removes and collects moisture from the cooled air. As with the first example, the condensate collected by the first water separator 5 may be sprayed onto the first charge air cooler 4 to give further evaporative cooling of the inlet air. Rather than passing the cooled air directly to the recuperator 6 as in the first example, the air is passed through a second compressor 2a. In the example shown in FIG. 2, this is part of a compressor/expander screw set including the expander 10, but any other suitable form of compressor may be used. The further compressed air will have an increased temperature compared to the air passing to the second compressor 2a. The further compressed air is passed through a second charge air cooler 4a where the air is further cooled, before passing to a second water separator 5a where moisture is again condensed are thereby removed from the air stream. Advantageously, the condensate is sprayed onto the second charge air cooler 4a to give additional evaporative cooling. The resulting air is then passed to the recuperator 6 for further cooling, before being passed though a coalescer and heater before being passed to the on-line bed of the pressure swing adsorption system as described with respect to the first embodiment.

By using a two stage compression and water removal system, rather than the single stage system described with respect to the first embodiment, greater efficiencies may be obtained, since the pressure increase required by each compression stage is less than would be required if the compression was carried out in a single stage.

In one example of a two stage compression system, the pressure of the air supplied to the on-line bed is the same as with a one stage compression system. However, it is believed that additional advantages may be achieved if the pressure is increased. With a lower moisture content but higher pressure inlet air to the on-line bed, it may be possible to reduce the size of the on-line bed. This is of particular advantage where the air filtration system is to be used in a vehicle, since any reduction in the size of the system will allow more space for other equipment and/or the crew. Further, with a small bed or with higher pressures, less purge air will be required to purge the off-line bed. This is important as, with low pressure systems, as much as 50% of the clean air produced by the system is required to purge the off-line bed, and is therefore not available for conditioning the environment. Decreasing the amount of air required for purging the off-line bed will increase the amount of cleaned air available for conditioning the environment, and therefore will increase the effective efficiency of the system.

In conventional systems, it is known to the use the cooling effect of the cool, clean air from the expander to cool the crew compartment and/or equipment. However, it has been found that the use of the cool air to remove water from the inlet air gives a significant benefit to the air filtration system. In particular, where the moisture content of the air being passed to the on-line bed of the pressure swing adsorption system is below 10° C. dew point at standard temperature and pressure, the overall efficiency of the system may be improved by around 40%. In this case, a separate cooling system may be provided to cool the crew environment and/or equipment. A suitable cooling system would be a vapour cycle cooling system, although other cooling systems may be used.

With conventional regenerative pressure swing adsorption systems, it is usual for all cooling of the crew compartment to be achieved using the regenerative pressure swing adsorption system. Therefore, even when the vehicle is not under nuclear, chemical or biological attack, it is still necessary to operate the regenerative pressure swing adsorption system merely to cool the environment. This is not an efficient way to cool the environment, for example compared to other cooling systems such as a vapour cycle cooling system. However, the size of known regenerative pressure swing adsorption systems means that there is not generally sufficient space for an additional cooling system. However, the regenerative pressure swing adsorption system may be smaller that those of the prior art due to the enhanced efficiency resulting from the removal of moisture in the air conditioned by the on-line bed, and requires fewer components and therefore the space saving may be used for an alternative cooling system, such as a vapour cycle cooling system. As noted above, this may be used to cool the crew space and/or equipment when the regenerative pressure swing adsorption system is operating to condition the air. A vapour cycle cooling system will operate more efficiently when the fresh air introduced for ventilation is dry, and therefore the dry air from the regenerative pressure swing adsorption system will be easily cooled by such a cooling system. When there is no requirement for removal of contaminants, for example when the environment protected is not under threat, it is then possible to merely control the temperature using the alternative cooling system, therefore leading to further efficiencies.

The components of the systems described are all readily available and/or are readily capable of being produced by a man of ordinary skill in the engineering arts. The PSA adsorption bed assemblies are manufactured by PALL Aerospace of Portsmouth, UK, a division of PALL Europe Limited and PALL Corporation, East Hills, N.Y., USA.

The invention claimed is:

1. A method for providing clean air to an environment, the method comprising:
   compressing incoming air contaminated with nuclear, biological and chemical contaminants;
   cooling the compressed air to produce cooled compressed air;
   removing water from the cooled compressed air;
   enabling access to a regenerative pressure swing adsorption system;
   directing the cooled, compressed air through the regenerative pressure swing adsorption system;
   receiving, from the regenerative pressure swing adsorption system, clean output air with contaminants removed therefrom;
   enabling access to an expander and using the expander to expand the cleaned air;
   providing the cleaned air to the environment; and
   enabling access to a first air cooler, a second air cooler, a first water separator and a second water separator;
   wherein cooling the compressed air and removing water from the compressed air includes passing the compressed air through the first cooler, passing the cooled air through the first water separator, passing the cooled air through the second cooler in which the cooled air is further cooled by cleaned air from the expander, and passing the air through the second water separator.

2. A method according to claim 1, in which the compression is suitably achieved by at least one of a turbo compressor, a piston compressor and a screw compressor.

3. A method according to claim 2, in which the compressor is driven through a gearbox.

4. A method according to claim 3, wherein driving the compressor through a gearbox involves at least one of driving the compressor using an engine of a vehicle, driving the compressor using a crankshaft of an auxiliary power unit, and driving the compressor using hydraulic or electric motor.

5. A method according to claim 1, further comprising filtering the incoming air before compressing the incoming air.

6. A method according to claim 1, further comprising filtering the compressed air to remove biological agents.

7. A method according to claim 6, wherein filtering the compressed air to remove biological agents includes passing compressed air through a high efficiency particulate (HEPA) filter.

8. A method according to claim 1, in which the first cooler uses heat exchange with at least one of ambient air, water and other cooling media.

9. A method according to claim 1, in which a condensate from at least one of the first and second water separator is applied to the first cooler to effect evaporative cooling and to further cool the inlet air.

10. A method of claim 9, in which the condensate is applied to the first cooler by spraying.

11. A method according to claim 1, in which water droplets are removed from the air by passing the air through a coalescer.

12. A method according to claim 1, further comprising providing a heater upstream of an on-line bed of the regenerative pressure swing adsorption system to increase the temperature of the air and reduce the relative humidity of the air to below 100%.

13. A method according to claim 1, in which the air supplied to an on-line bed of the regenerative pressure swing adsorption system has a dew point below around 10° C. at standard temperature and pressure.

14. A method according to claim 1, in which the compression of the inlet air is achieved in two or more sequential steps.

15. An apparatus for providing clean air to an environment comprising:
   a compressor for compressing inlet air;
   a first cooler for cooling the inlet air compressed by the compressor;
   a first water removal mechanism for removing water from the cooled, compressed air;
   a second cooler for further cooling the inlet air;
   a second water removal mechanism for removing additional water from the air;
   a regenerative pressure swing adsorption system for removing contaminates from the air; and
   an expander for expanding cleaned air from the pressure swing adsorption system for supply to the environment, in which the air is cooled in the second cooler by the cool expanded air from the expander.

16. An apparatus according to claim 15, in which the compressor comprises at least one of a turbo compressor, a piston compressor and a screw compressor.

17. An apparatus according to claim 16, in which the compressor is driven through a gearbox.

18. An apparatus according to claim 17, in which at least one of an engine of a vehicle, a crankshaft of an auxiliary power unit, a hydraulic or electric motor are configured to drive the compressor through the gearbox.

19. An apparatus according to claim 15, further comprising a filter upstream of the compressor to filter the inlet air before the air is compressed.

20. An apparatus according to claim 15, further comprising a filter provided after the compressor to remove and destroy biological agents in the compressed air stream.

21. An apparatus according to claim 20, in which the filter is a high efficiency particulate (HEPA) filter.

22. An apparatus according to claim 15, in which the first cooler comprises a heat exchanger.

23. An apparatus according to claim 22, in which the heat exchanger is at least one of an ambient air heat exchanger and a water cooled heat exchanger.

24. An apparatus according to claim 15, further comprising a cooling mechanism configured to apply condensate from at least one of the first and second water removal mechanisms onto the first cooler to give evaporative cooling.

25. An apparatus according to claim 24, wherein the cooling mechanism is configured to spray the condensate on the first cooler.

26. An apparatus according to claim 15, further comprising a coalescer that removes water droplets in the air.

27. An apparatus according to claim 15, further comprising a heater, positioned upstream of an on-line bed of the regenerative pressure swing adsorption system, to increase the temperature of the air, and to reduce the relative humidity of the air to below 100%.

28. An apparatus according to claim 15, in which the expander is coupled to the compressor, thereby recovering energy from the cleaned air to drive the compressor.

29. An apparatus according to claim 15, further comprising a cooling mechanism for cooling the air in the environment to be controlled.

30. An apparatus according to claim 29, in which the cooling mechanism comprises a vapour cycle cooling system.

31. An apparatus for providing clean air to an environment comprising:
 a compressor for compressing inlet air;
 a first cooler for cooling the inlet air compressed by the compressor;
 first water removal means for removing water from the cooled, compressed air;
 a second cooler for further cooling the inlet air;
 second water removal means for removing additional water from the air;
 a regenerative pressure swing adsorption system for removing contaminates from the air; and
 an expander for expanding cleaned air from the pressure swing adsorption system for supply to the environment, in which the air is cooled in the second cooler by the cool expanded air from the expander.

* * * * *